United States Patent
Tejeda

[11] 3,893,901
[45] July 8, 1975

[54] SYSTEM FOR SOFTENING AND DEALKALIZING WATER BY ELECTRODIALYSIS

[75] Inventor: Alvaro R. Tejeda, New York, N.Y.

[73] Assignee: J. Vast Associates, Inc., New York, N.Y.

[22] Filed: Dec. 4, 1973

[21] Appl. No.: 421,510

[52] U.S. Cl............ 204/301; 204/180 P; 204/180 B
[51] Int. Cl................................................ B01d 13/02
[58] Field of Search............. 204/180 P, 301, 180 B

[56] References Cited
UNITED STATES PATENTS

| | | | |
|---|---|---|---|
| 2,815,320 | 12/1957 | Kollsman | 204/180 P |
| 3,149,061 | 9/1964 | Parsi | 204/180 P |
| 3,485,737 | 12/1969 | Kakihana et al. | 204/180 R |
| 3,493,488 | 2/1970 | Sisk | 204/301 |
| 3,645,884 | 2/1972 | Gilliland | 204/301 |
| 3,686,089 | 8/1972 | Korngold et al. | 204/180 P |

Primary Examiner—John H. Mack
Assistant Examiner—A. C. Prescott
Attorney, Agent, or Firm—Kirschstein, Kirschstein, Ottinger & Frank

[57] ABSTRACT

A process for softening or dealkalizing water with the aid of electrodialysis. For softening, the water is passed through a cation exchange material disposed between a pair of cation permselective membranes. For dealkalizing, the water is passed through an anion exchange material disposed between a pair of anion permselective membranes. The ion exchange permselective membranes of like type having ion exchange material of the same type located between them form a chamber in an electrodialytic cell with electrodes at opposite ends of the cell to which a source of direct current is applied.

15 Claims, 8 Drawing Figures

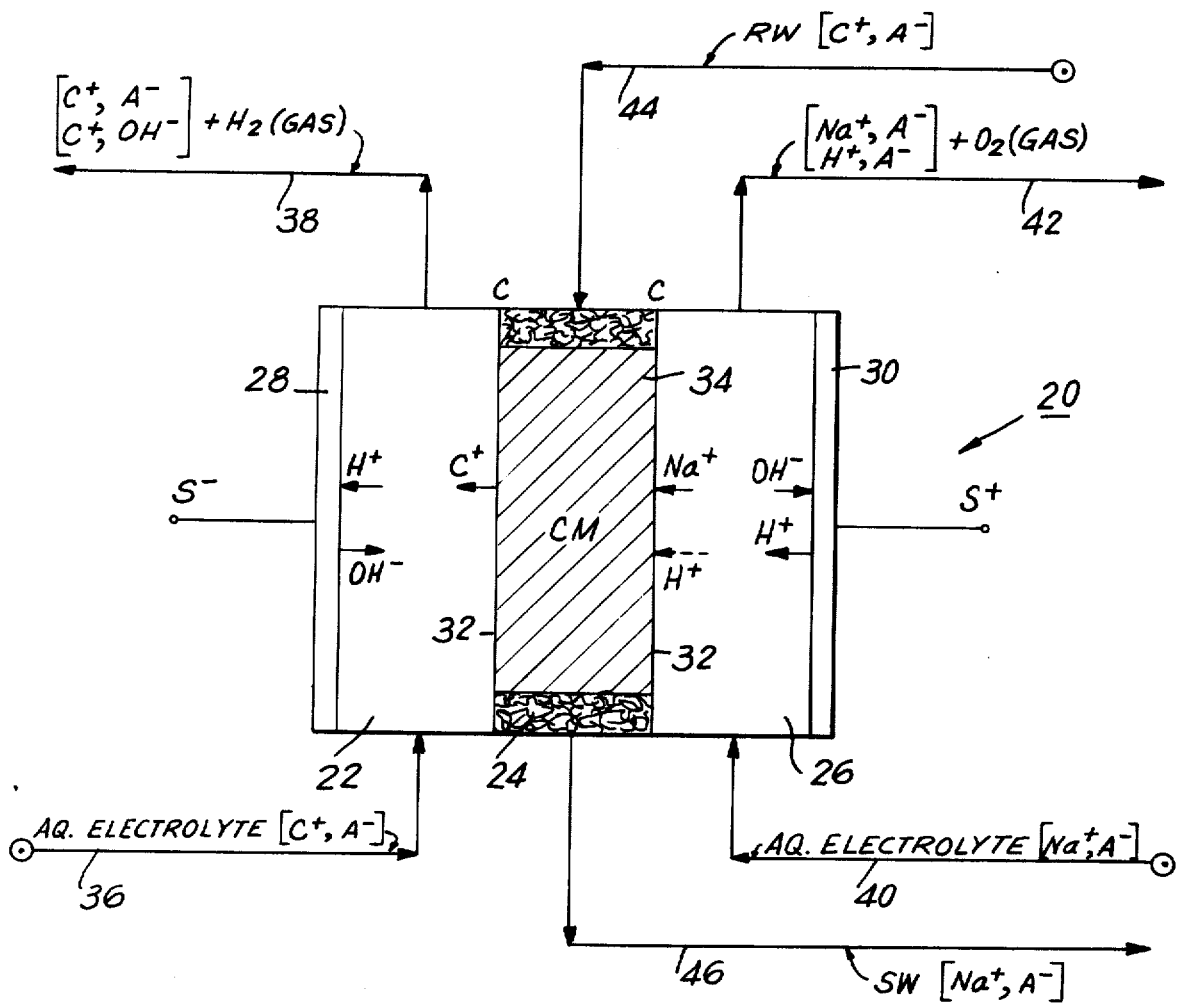

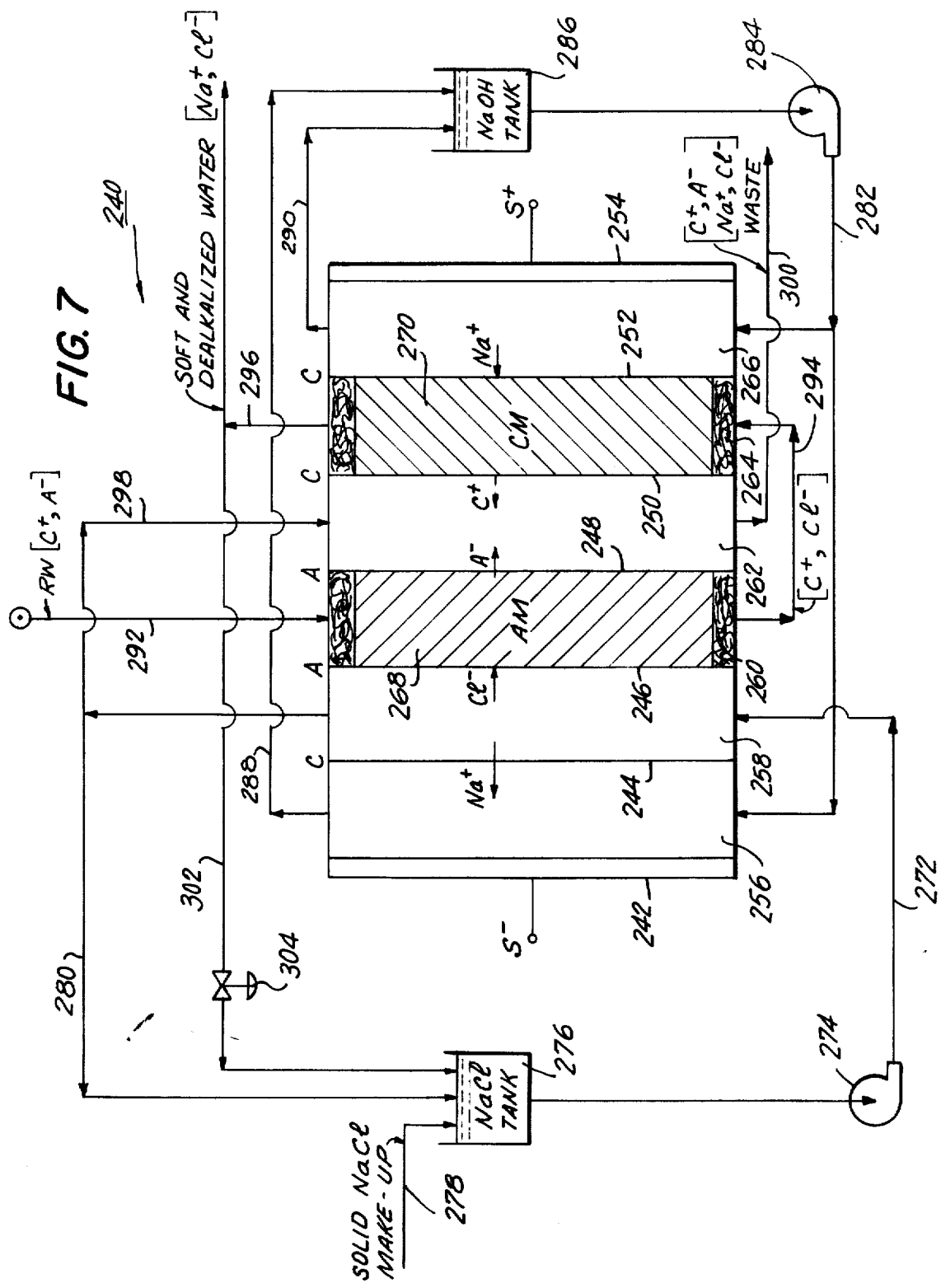

SYSTEM FOR SOFTENING AND DEALKALIZING WATER BY ELECTRODIALYSIS

CROSS-REFERENCE TO RELATED APPLICATIONS

The present application is related to co-pending applications Ser. Nos. 321,333 and 359,702, filed respectively on Jan. 5, 1973 and May 14, 1973, and having the respective titles "SYSTEM FOR INHIBITING ATTACK ON A FERROUS ANODE ELECTRODE IN AN ELECTRODIALYTIC CELL" and "SYSTEM FOR DEMINERALIZING WATER BY ELECTRODIALYSIS."

BACKGROUND OF THE INVENTION

1. Field of the Invention

Method and apparatus for effecting changes in the ionic constituents, by ion substitution, of aqueous electrolytic solutions by electrodialysis and, in particular, the softening and dealkalizing of water for home, industrial and other applications.

2. Description of the Prior Art

Water, as obtained from natural sources, frequently contains substantial concentrations of dissolved salts. For example, rain water, which falls from the clouds through the atmosphere before reaching the earth, usually will dissolve traces of acidic gases from the air such, for example, as carbon dioxide, sulfur dioxide, nitrous oxides, etc., thus forming mineral acids. As the acidic water seeps through the ground it will dissolve the various components of the soil which are either water soluble, per se, or become soluble by virtue of chemical action with the mineral acids in the water. Water percolating through the ground also dissolves various salts present therein. Hence, ground water such, for instance, as wells and springs, and surface waters such, for instance, as rivers, lakes and oceans, contain more or less dissolved matter most of which are electrolytes in solution and, therefore, ionized. The charge on any given single ion may be positive or negative depending upon whether it is a cation or anion. Thus, metallic cations and hydrogen cations usually are positively charged, whereas the anions such as bicarbonates, carbonates, sulfates, nitrates and chlorides are negatively charged, the charges for the ions of any given salt in solution being balanced. The cations which most commonly occur in natural water, be it ground or surface, are sodium (Na-), calcium ($Ca^{++}$) and magnesium ($Mg^{++}$). Other cations which frequently are present include potassium, iron and manganese. There also are traces of cations such, for instance, as lithium, rubidium and ammonium. All the foregoing cations are hereinafter referred to as "common" cations. The most commonly occurring anions in ground and surface waters are those which produce alkalinity such, for instance, as bicarbonates ($HCO_3^-$) and carbonates ($CO_3^{++}$), as well as anions which produce acidity such as chlorides ($Cl^-$) and sulfates ($SO_4^{++}$) in addition to lesser amounts of nitrates, fluorides and phosphates. All the foregoing anions are hereinafter referred to as "common" anions.

Calcium and magnesium are positively charged cations each of which carries two unit ionic charges. The presence of calcium and magnesium in natural water is, as is well known, the cause of hardness. They will produce scaling in appliances and boilers. They will form a scum or precipitate by interaction with soap.

The presence of cations and anions is objectionable for many purposes and in many systems that utilize water. It frequently is necessary to subject water containing such ions to softening and/or dealkalizing treatment prior to its use.

Familiar examples of treatments used heretofore are the softening of hard water to render it suitable for household use, and the softening and dealkalizing of water supplies for boiler feed water make-up to prevent accumulations of deposits of salts in the boiler and its auxiliary equipment. It long has been known that hard water causes scaling in household appliances and that it produces a curd in the presence of soap before a lather can be created, thus soiling kitchen and bathroom fittings. This curd also imparts a somewhat grayish appearance to laundry in addition to wasting soap.

Early attempts at removing hardness in water included boiling it to precipitate those salts which caused a considerable part of the hardness, specifically calcium and magnesium bicarbonate. Also, a commercial process known as Clarke's was used, this being a lime softening method. Even today modifications of the latter are used widely. But unlike boiling, which transforms the calcium and magnesium bicarbonates to carbonates which are insoluble and will precipitate, the liming process does not remove the calcium and magnesium salts such as the chlorides, sulfates, etc.

A well known and very effective process for removing the hardness and/or the alkalinity from water supplies is by means of an ion exchange process. The first commercial application of an ion exchange process was the softening of water by Dr. Gans in 1905. Since that time, the ion exchange method of softening has become a widespread treatment process and the original material and synthetic Zeolite type materials were replaced over the years by newer and more versatile ion exchangers, such as the sulfonated coals, the Bakelite type resins and, more recently, by the physically and chemically resistant high-capacity materials of the sulfonated polystyrene bead type.

The softening of water by ion exchange relies on the replacement of the calcium and magnesium ions in the water by an equivalent number of sodium ions. This eliminates the undesirable characteristics of hard waters, because sodium salts do not form scale, nor a scum with soap, only lather. Chemically, the process of softening may be illustrated by the following equation:

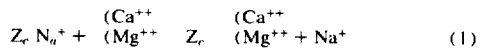
(1)

where $Z_r$ represents a cation exchange resin.

When the capacity of the resin has been exhausted, i.e., substantially all the sodium ions have been replaced by calcium and/or magnesium, regeneration of the resin back to the sodium form is necessary. This is done by passing through the resin a solution of sodium chloride (brine) as may be illustrated by this equation:

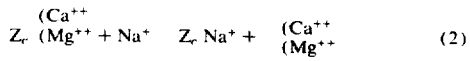
(2)

which is the reverse of equation (1).

In the case of high alkalinity waters, i.e., water containing considerable concentrations of bicarbonates, it may be desirable to remove such alkalinity. Again, this can be done by ion exchange. The chloride-anion exchange process relies on replacing the bicarbonate ions present in the water with chloride ions, using a strongly basic anion exchanger, regenerated with sodium chloride.

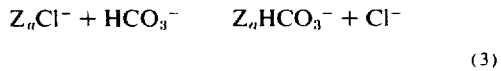

(3)

where $Z_a$ represents an anion exchange resin.

When the capacity of resin has been exhausted, i.e., substantially all the chloride ions have been replaced by bicarbonate ions, regeneration of the resin back to the chloride form is necessary. This is done by passing through the resin a solution of sodium chloride (brine), as may be illustrated by this equation:

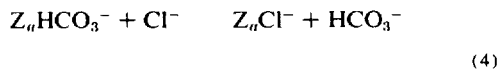

(4)

which is the reverse of equation (3).

A disadvantage with all such ion exchange procedures is that the beds of ion exchange materials become exhausted after a period of use and must thereof be removed from service and regenerated at frequent intervals; in other words, the disadvantages are those attendant upon all batch processes. The regeneration of the softening and dealkalizing ion exchange resin is done by treatment with a substantial amount of regenerant brine solution, about 10 to 12 pounds of sodium chloride per cubic foot of resin. This treatment is inconvenient and relatively expensive.

Furthermore, since the water treating equipment is unavailable for use during the period of regeneration, storage tanks for treated water or duplicate stand-by equipment must be provided in cases where continuously treated water is desired.

As can be seen, the softening and dealkalizing of water by any of the conventional ion exchange processes is essentially a batch or discontinuous process.

Furthermore, conventional ion exchange processes are not very effective, and in many cases not economical, when the raw water to be treated contains more than 1,000 ppm of total dissolved solids.

Softening and dealkalization of water may also be effected by electrodialysis with permselective membranes in conjunction with ion exchange resins, both cation and anion types, or other exchange materials such as ion exchange foams, fabrics, fibers, etc. (see British Pat. Specification No. 815,154 to Frank Lawrence Tye).

SUMMARY OF THE INVENTION

1. Purposes of the Invention

It is a principal object of the present invention to provide an electrodialytic system which by suitable adjustment of the types of exchange material and permselective membranes employed is capable of either softening or dealkalizing water at a low power consumption and high efficiency.

It is another object of the invention to provide an electrodialytic system for softening water at a low power consumption and high efficiency.

It is another object of the invention to provide an electrodialytic system for dealkalizing water at a low power consumption and high efficiency.

It is another object of the invention to provide a continuous electrodialytic softening or dealkalizing process which does not require shut-downs for regeneration or the use of a regenerant for this purpose.

It is another object of the invention to provide an electrodialytic process of the character described in which the precipitation of insoluble materials within the sundry chambers of an electrodialytic cell is substantially eliminated.

Other objects of the invention in part will be obvious and in part will be pointed out hereinafter.

2. Brief Description of the Invention

According to the present invention, a softening or dealkalizing process is accomplished electrodialytically by incorporating in an electrodialytic cell a chamber defined by two spaced ion permselective membranes of the same type between which is disposed an ion exchange material of the same type; or, phrased differently, if the two membranes are cation permselective, then the ion exchange material is a cation exchange material and, conversely, if the two permselective membranes are of the anion permselective type, then the ion exchange material is an anion exchange material. Where all three of the foregoing components are of the cation type, the system will produce softened water, which is to say, water in which the cation of the output is principally sodium, and when all three are of the anion type, the process will produce dealkalized water which is a water in which the anion is a chloride.

The aforesaid chamber which, as noted may either be a softening chamber or a dealkalizing chamber depending upon the types of materials used, is a chamber which forms part of an electrodialytic cell having a cathode electrode at one end and an anode electrode at the other. Preferably, the permselective membranes are flat and parallel, although it is within the scope of the invention to employ concentrically spaced permselective membranes around a central core. The ion exchange material, typically, is in the form of a bead-like ion exchange material, or an ion exchange foam, or an ion exchange fabric, or an ion exchange cloth. Such a cell also may include cathode and anode electrode chambers which are so designed as to enable the use of ferrous electrodes, and particularly a ferrous anode, these being described and claimed in co-pending application Ser. No. 321,333. The cell further may have additional chambers to provide auxiliary functions.

BRIEF DESCRIPTION OF THE DRAWINGS

In the accompanying drawings in which are shown various possible embodiments of the invention:

FIGS. 6 and 7 schematic views of electrodialytic cells constructed in accordance with the present invention for softening and dealkalizing water.

PREFERRED EMBODIMENTS OF THE INVENTION

Figure 1A:
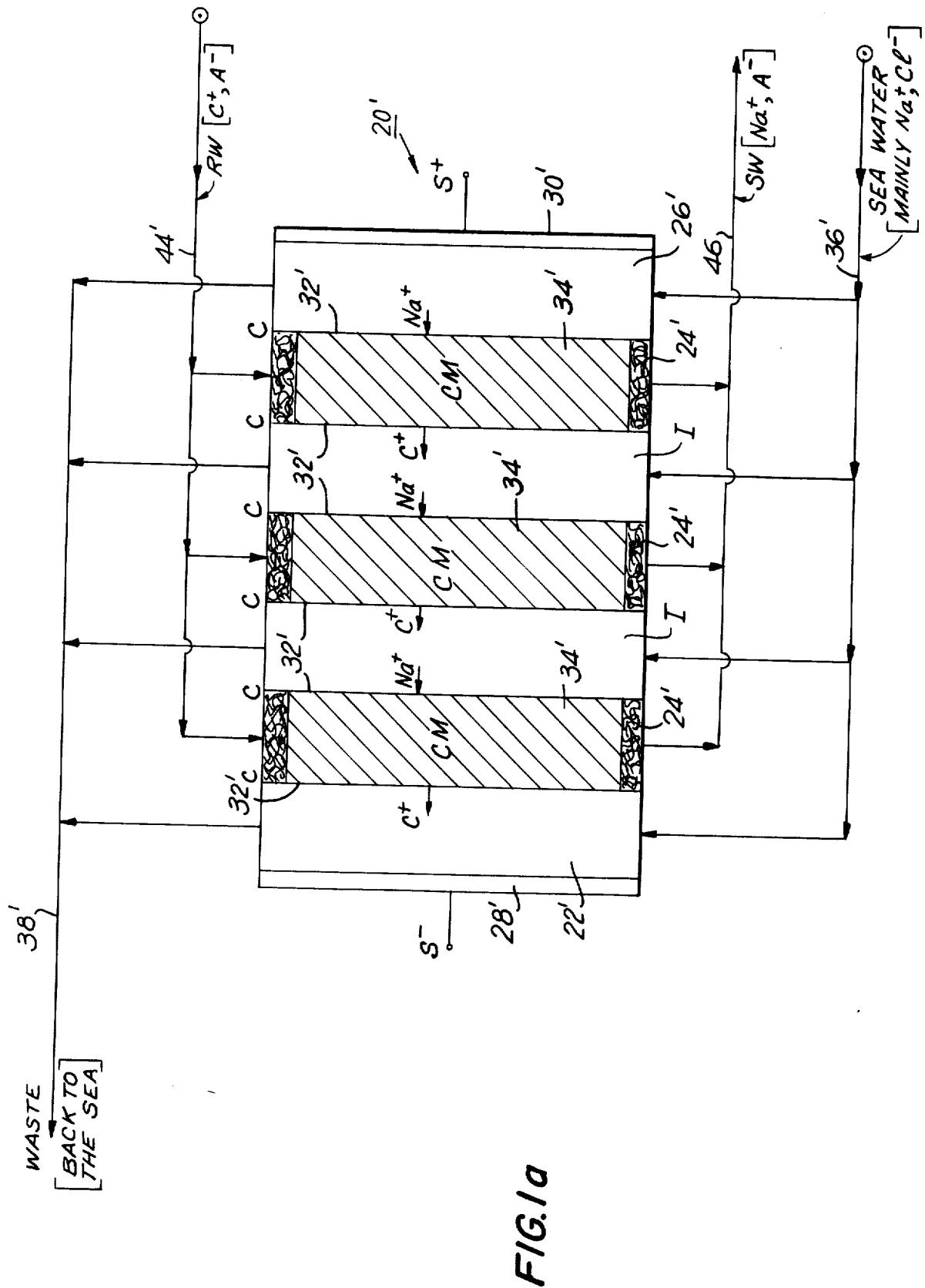
FIGS. 1–3 are schematic views of different electrodialytic cells constructed in accordance with the present invention for softening water, FIG. 1a being a view similiar to FIG. 1, but showing the FIG. 1 cell repeated in a battery.

In FIG. 1 there is illustrated the simplest form of electrodialytic cell 20 for carrying out the present invention. This cell is not the best form of the invention for commercial use. However, it does serve to clearly illustrate the essential features of the present invention. The cell 20 has been shown with only three chambers 22, 24, 26, the chambers 22 being a cathode electrode chamber, the chamber 26 being an anode electrode chamber, and the chamber 24 being a softening chamber.

The cell has a cathode plate 28 and an anode plate 30 to which a suitable D.C. potential is applied from a source S such, for example, as a rectifier.

The sides of the softening chamber constitute cation permselective membranes 32.

As illustrated, the simple cell 20 is formed of the two electrode plates and the two cation permselective membranes, the cathode electrode chamber 22 being defined by the cathode plate 28 and one of the cation permselective membranes 32, and the anode electrode chamber 26 being defined by the anode plate and the other cation permselective membrane.

The softening chamber is filled with a cation exchanger material 34.

Exemplificative cation permselective membranes are 61AZL183, 61AZL065, 61AZL066, 61 CZL183, 61 AZG067, 61AZS068 and 61DYG067, manufactured by Ionics, Inc.; MC-3142 and MC-3470 manufactured by Ionac Chemical of Sybron Corp.; AMFion C-100 manufactured by AMFion Products/American Machine and Foundry Co.; and CK-1 and DK-1 manufactured by Asahi Chemical Industry Co. Ltd. Exemplificative cation exchange materials are the cation exchange resins Amberlite 200, 200C, 252, IR-116, IR-120, IR-120 PLUS, IR-120PD and IR-124 manufactured by Rohm & Haas Co. Typical materials for the electrodes are platinized titanium, platinized tantalum and carbon. Less expensive electrodes can be used, but as will be pointed out hereinafter, this should be accompanied by the use of a certain type of electrode chamber, at least at the anode, an electrode chamber pursuant to the disclosure of co-pending application Ser. No. 321,333.

The electrode plates and the membranes may be, and preferably are, flat and parallel to one another and are separated by gaskets. Suitable means (not shown) urges the electrodes toward one another to compress the membranes and gaskets between them. However, as is known in the art, one of the electrodes may be a central member, the other electrode may be an outer tubular member and the membranes may be of tubular configuration and located between the central member and the outer tubular member, the membranes being concentrically disposed along with the outer member about the central member and, in this event, the top and bottom of the cell are capped.

An electrolyte is supplied through an inlet conduit 36 to the cathode electrode chamber 22 and liquid leaves the cathode electrode chamber through an outlet conduit 38. Similarly, an electrolyte is led to the anode electrode chamber 26 through an inlet conduit 40 and exits from said chamber through an outlet conduit 42. In the elementary form of the cell 20 under consideration, any electrolyte can be supplied to the cathode electrode chamber and any electrolyte can be supplied to the anode electrode chamber, providing the latter electrolyte contains sodium ions ($Na^+$). As a matter of convenience, the electrolytes supplied to both electrode chambers are brine.

The brine can be a common brine, that is to say, common in the sense that it is not prepared with special water such as deionized water but will contain various cations and anions in addition to the sodium and chloride ions. Typical cations are sodium, potassium, hydrogen, ammonium, calcium, magnesium, lithium, rubidium and cesium. Typical anions in addition to the chloride are bicarbonate, carbonate, sulfate and nitrate.

An inlet conduit 44 leads a liquid electrolyte to be treated to the softening chamber 24, the liquid, after softening, leaving said chamber through an outlet conduit 46. This liquid contains cations for which sodium ions are to be substituted. Typically, the material is raw water, i.e., untreated water, such, for example, as rain water and ground water. Waters of this nature, typically, will contain sodium and other metallic cations which latter are to be removed. These include sodium, potassium, calcium, magnesium, lithium, rubidium and cesium. The principal troublesome metallic cations which it is desired to be removed are calcium and magnesium because many salts including these cations are or can become insoluble to form a precipitate, mud or cake which will interfere with the use of the water or in the presence of soap will form a curd or scum. The raw water also includes the usual anions which are chloride, bicarbonate, carbonate, sulfate and nitrate. These latter are not to be removed in the treating chamber.

In the operation of the cell, water containing cation contaminants that are to be removed in the softening process are led into the softening chamber 24. The undesired cations will pass from the softening chamber through the membrane 32 closer to the cathode plate into the cathode electrode chamber 22 under the influence of the applied voltage. Moreover, the electrolyte in the cathode electrode chamber will be subject to electrolyzation discharging hydroxy ions into the cathode electrode chamber and hydrogen ions toward the cathode plate where they form hydrogen gas that exits through the top of the cathode electrode chamber through an opening provided in the gasket separating the cathode plate from the adjacent cation permselective membrane 32. The liquid leaving the cathode electrode chamber, therefore, will be on the alkaline side. One of the problems with this simple cell which prevents it from being the most desirable form of the invention, even though it has been selected for a rudimentary explanation of the invention, is that some hydroxide ions will combine in the cathode electrode chamber with some of the cations present in the brine, for example, magnesium and calcium. These metallic hydroxides are insoluble so that they will tend to precipitate and interfere with the operation of the system.

In the other electrode chamber, to wit, the anode electrode chamber 26, a different action is taking place. Sodium ions will be passing, under the influence of the applied voltage, from the source S, from the anode electrode chamber 26 through the cation permselective membrane 32 closest to the anode plate 30 into the softening chamber 24 where they come into contact with the cation exchange material 34 which is operating on an Na+ cycle. In the presence of this material, the sodium ions entering the softening chamber replace the cations leaving the softening chamber and passing through the opposite membrane into the cathode electrode chamber so that sodium ions will be substituted for the various undesired cations such as calcium and magnesium. Hence, the liquid leaving the softening chamber 24 now will contain as cations principally sodium ions whereby such objectionable cations are removed and the softened water now can be used without difficulty for industrial and household purposes, where hard water would be objectionable.

Attention is directed to the fact that because the cation exchange material operating on the sodium cycle is disposed between a pair of cation permselective membranes in an electrodialytic cell and because sodium ions are in the electrolyte flowing through the anode electrode chamber so that sodium ions permeate from the anode electrode chamber into the softening chamber, the cation exchange material maintains substantially its original sodium charged state and, therefore, the cation exchange material in the softening chamber does not need to be recharged so that the cell fashioned as above can run indefinitely except for the hard water hydroxides which precipitate in the cathode electrode chamber. However, insofar as the cation exchange material is concerned, such material is not subject to the defect which commonly accompanies the use of cation exchange material and which has been mentioned above, to wit, the necessity for recharging the same periodically.

Due to the electrolyzation which must occur in the anode electrode chamber, hydrogen ions will be formed and pass through the cation permselective membrane closer to the anode plate and oxygen ions will form and migrate toward the anode plate where they form oxygen gas that exits through a vent provided in an opening at the top of the gasket separating the anode plate from the adjacent cation permselective membrane 32. The presence of these hydrogen ions in the effluent from the softening chamber 24 and, hence, in the soft water, imparts to the softened water leaving through the conduit 46 an acid pH. Such acidic softened water has various applications because the acidity is not high. It does not, however, represent the preferred form of the invention because, over and above the presence of hydrogen ions in the softened water, the transmission of hydrogen ions through the aforesaid permselective membrane adjacent the anode plate reduces cell efficiency.

Furthermore, the presence of oxygen in the acid medium existing in the anode electrode chamber 26, both of which are produced by electrolyzation, results in a severe attack on the anode plate if the same is made of metal unless such metal is inert. This latter problem can be cured readily by use of the invention of the aforesaid co-pending application Ser. No. 321,333, i.e., by sweeping the anode electrode chamber 26 with a hydroxide of a cation selected from the group consisting of sodium, potassium, lithium, cesium, rubidium and ammonium, preferably sodium hydroxide, rather than simply brine.

A further advantage of passing a sodium hydroxide electrolyte through the simple cell of FIG. 1 is that hydrogen ions are not introduced into the softening chamber so that the effluent from the softening chamber exiting through the outlet conduit 46 has essentially the same pH as that of the raw water which is introduced through the inlet conduit 44.

The foregoing cell 20 can be repeated in a series multiple in which more than one softening chamber is employed with intermediate chambers interposed between adjacent softening chambers and with electrode chambers at the opposite ends. The intermediate chambers are fed with sea water. Such a cell is shown in FIG. 1a where the numerals for the same elements are identical to those used in FIG. 1, but primed. The intermediate chambers are identified by the reference character I.

Figure 2:
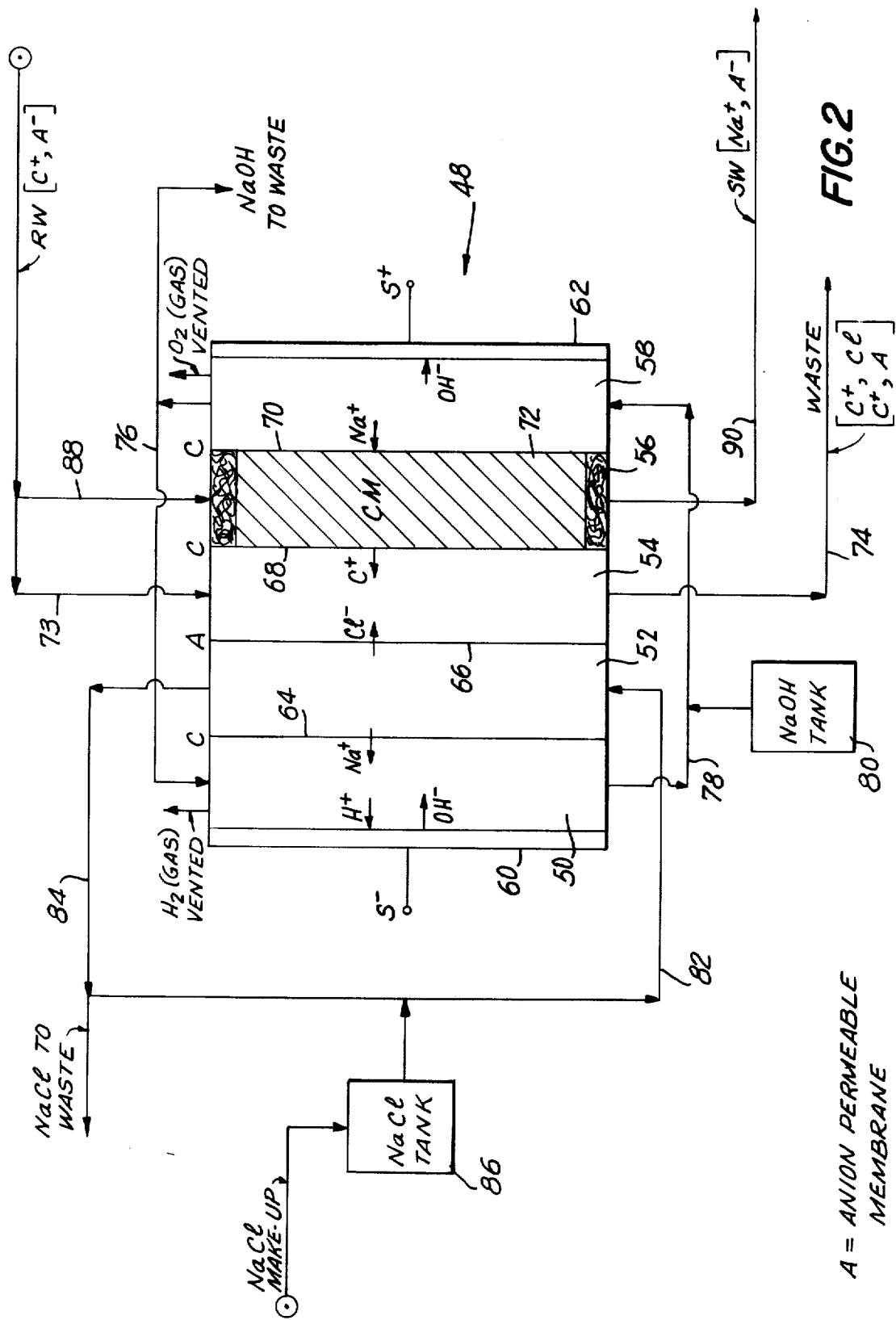

In FIG. 2 there is illustrated a somewhat more sophisticated form of electrodialytic cell 48. This is an improvement over the simple cell 20 in that provision is made for generating internally of the cell and for supplying externally of the cell sodium hydroxide to sweep the anode electrode chamber so as to maintain unaffected the pH of the water to be softened and inhibit electrochemical corrosion of the anode plate in the event that the latter is constituted of a ferrous metal. This cell is composed of more chambers than those employed in the cell 20.

Specifically, the cell 48 includes a cathode electrode chamber 50, an intermediate chamber 52 employed in the sodium chloride circuit, a waste chamber 54, a softening chamber 56 and an anode electrode chamber 58. The cell further includes a cathode plate 60 and an anode plate 62. A negative potential is applied to the cathode plate from a source S and a positive potential is applied to the anode plate from the same source.

The cathode electrode chamber 50 is defined by the plate 60 and a cation permselective membrane 64. The intermediate chamber 52 is defined by the cation permselective membrane 64 and an anion permselective membrane 66. The waste chamber 54 is defined by the anion permselective membrane 66 and a cation permselective membrane 68. The softening chamber 56 is defined by the cation permselective membrane 68 and a third cation permselective membrane 70. The anode electrode chamber is defined by the cation permselective membrane 70 and the anode plate 62. All the various plates and membranes are parallel and spaced from one another. Adjacent ones of the aforesaid elements are separated from one another by gaskets.

As in the case of the cell 20, the cell 48 could be composed of a central electrode surrounded by successively larger diameter tubular membranes and an outer annular electrode.

The softening chamber 56 is filled with a cation exchange material 72 such as any of the materials mentioned with respect to the cell 20. The cation permselective membranes are any one of those mentioned with respect to the cell 20. Exemplificative of the membranes that can be used for the anion permselective membrane 66 are 111BZL183, 111BZL066, 111BZL065 and 111EZL219 manufactured by Ionics, Inc.; MA-3148 and MA-121 3475 manufactured by Ionac Chemical of Sybron Corp.; AMFion A-100 manufactured by AMFion Products/American Machine and Foundry Co.; and CA-1, CA-2, DA-1 and DA-2 manufactured by Asaki Chemical Industry Co. Ltd.

The liquid flow circuits include a waste first circuit having an inlet conduit 73 leading from a source of raw water to the waste chamber 54, and an outlet conduit 74 leading from the waste chamber to waste.

A second liquid flow circuit is an electrode chamber circuit. This includes a first transfer conduit 76 leading from the anode electrode chamber 58 to the cathode electrode chamber 50, and a second transfer conduit 78 leading from the cathode electrode chamber to the anode electrode chamber. There may be inserted in this electrode chamber circuit a sodium hydroxide replenishment tank 80. This kind of tank is described in more detail in co-pending application Ser. No. 321,333. It includes a vessel containing a concentrated solution of sodium hydroxide or a vessel to which concentrated sodium hydroxide is fed from a suitable source. The sodium hydroxide tank is employed to make certain that there is sufficient sodium hydroxide in the electrolyte which sweeps the anode electrode chamber; sufficient, that is to say, to prevent attack of the anode plate if the same is not made of an inert metal, for example, if it is a ferrous plate A bleed leads from the sodium hydroxide flow circuit to waste in order to provide the volume necessary to accommodate sodium hydroxide replenishment.

A third liquid flow circuit is a sodium chloride circuit. This includes an inlet conduit 82 leading from a source of sodium chloride solution which may, for example, be common brine or sea water, into the intermediate chamber 52, and an outlet conduit 84 which runs from the outlet of the intermediate chamber back to the inlet conduit 82. Interposed in the conduit 84 is a sodium chloride make-up tank 86 which is essentially the same as the sodium hydroxide make-up tank. The sodium chloride make-up tank contains a concentrated sodium chloride solution or is supplied through a suitable feed pipe from a supply of concentrated sodium chloride. The necessity for make-up sodium chloride will become apparent from the subsequent description of the operation of the cell 48. The sodium chloride circuit may be a closed circuit, as illustrated, except for the bleed flow to waste to accommodate for sodium chloride replenishment.

A fourth liquid flow circuit is that for providing softened water. This includes an inlet conduit 88 leading from the raw water source to the softening chamber 56, and an outlet conduit 90 leading from said softening chamber.

The operation of the cell 48 is much like that of the cell 20. The electrolyte in the cathode electrode chamber 50 is electrolyzed to liberate hydrogen gas which leaves the cathode electrode chamber as a vented gas. Concurrently, hydroxide ions are liberated. These combine with sodium ions which pass through the cation permselective membrane 64 from the sodium chloride circuit in the intermediate chamber 52 to form sodium hydroxide. The sodium hydroxide solution flows through the second transfer conduit 78 to the anode electrode chamber 58. In this chamber the electrolyte is electrolyzed, the sodium ions passing through the cation permselective membrane 70 into the softening chamber 56 where, in the presence of the cation exchange material 72 on an $Na^+$ cycle, sodium cations replace undesirable cations of salts present in the raw water such, for instance, as calcium and magnesium cations. The sodium hydroxide produced in the cathode electrode chamber makes up for the sodium hydroxide thus lost in the anode electrode chamber. If any additional sodium hydroxide is required, it is supplied from the sodium hydroxide make-up tank 80. The undesirable cations will pass through the cation permselective membrane 68 of the softening chamber into the waste chamber 54. Concurrently, chloride anions will pass through the anion permselective membrane 66 from the intermediate chamber 52 where such anions are supplied by the sodium chloride solution entering through the inlet conduit 82. Chloride salts of the undesirable cations formed in the waste chamber 54 exit through the outlet conduit 74 to waste. It will be observed that these chlorides are water soluble, as indeed are all chlorides.

The foregoing arrangement prevents the formation of insoluble salts of the undesirable cations in the cell and, thus, is an improvement over the simple cell 20 of FIG. 1. Also, as readily will be apparent, the softened water leaving through the outlet conduit 90 will not be acidified due to the presence of hydrogen ions introduced through the cation permselective membrane 70 from the anode electrode chamber 58 so that the outlet will have substantially the same pH as the pH of the raw water source.

Although there has been shown a cell 48 containing only a single softening chamber, it will be quite apparent that this cell can be scaled up as to the number of softening chambers employed, each softening chamber desirably having in association with it one sodium chloride chamber and one waste chamber, so that for each additional softening chamber there are, in addition, two extra chambers.

In order to better appreciate the invention, a few typical examples will be given for an eight chamber cell similar to the five chamber cell of FIG. 2 but with three additional chambers interposed between the anode electrode chamber 58 and the softening chamber 72, in the following order: another softening chamber, another waste chamber and another intermediate chamber, i.e., salt chamber.

The electrode plates for both anode and cathode are stainless steel (No. 304) plates 1/16 inch thick and of rectangular configuration, being 21 ½ inches high and 4 ½ inches wide; the sundry cation permselective membranes are AMFion C-100 and the anion permselective membranes are AMFion A-100; the cation exchange material in the softening chambers is Amberlite IR-120; the effective areas of the sundry permselective membranes and electrodes is 0.4 sq. ft.; the thickness of all chambers except the electrode chambers is three thirty-second inch; the thickness of the electrode chambers is one thirty-second inch.

Typical exemplificative runs follow:

|  | EXAMPLES | | |
|---|---|---|---|
|  | 1 | 2 | 3 |
| Feed water hardness, ppm as Ca $CO_3$ | 254 | 260 | 250 |
| Feed water pH | 6.5 | 6.9 | 6.9 |
| Pressure, psi | 4 | 5½ | 4 |
| Flow rate per softening chamber gph | 2 | 3 | 2 |
| Current density, amps/sq. ft. | 2.5 | 2.5 | 1.25 |
| Total current, amperes | 1.0 | 1.0 | 0.5 |
| Voltage between electrodes, volts | 7.5 | 7.5 | 5.5 |
| Caustic concentration in sodium hydroxide make-up tank, ppm as sodium hydroxide | 2000 | 2000 | 2000 |
| Salt concentration in salt make-up tank, ppm as sodium chloride | 5000 | 5000 | 5000 |
| Effluent soft water hardness, ppm as Ca $CO_3$ | 10 | 14 | 25 |
| Effluent soft water pH | 7.5 | 7.6 | 7.2 |
| Hardness removal, % | 96 | 95 | 90 |
| D.C. power consumption, kwh/1000 gals of softened water | 3.8 | 2.5 | 1.38 |

Figure 3:
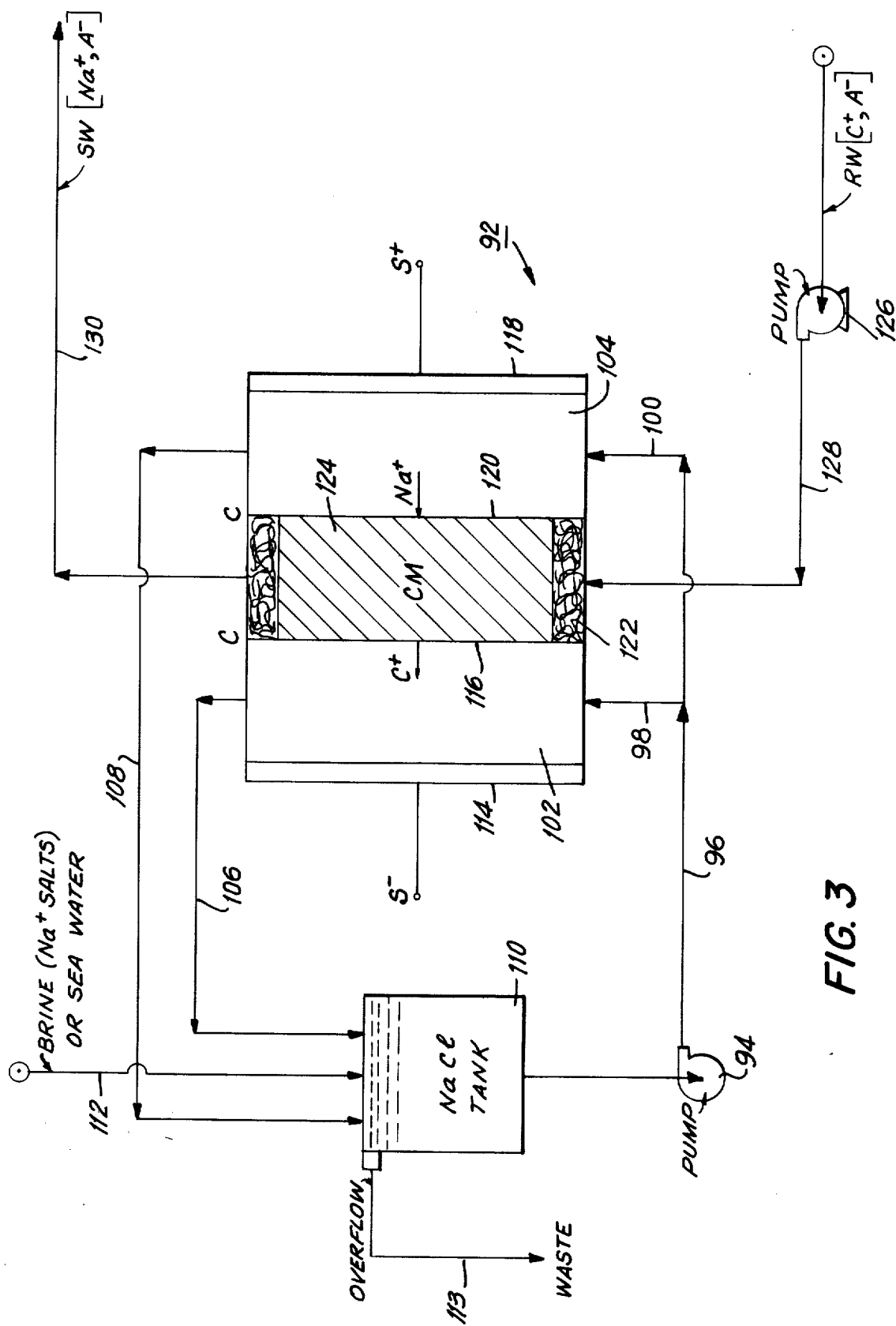

FIG. 3 shows an electrodialytic cell 92 which is markedly similar to that shown in FIG. 1, differing therefrom in that it includes a recirculation system for sweeping an electrolyte in parallel through the two electrode chambers. Due to this similarity, the cell of FIG. 3 will not be described in structural detail followed by an operational procedure but will be described purely from an operational point of view. The cell 92 includes a pump 94 which forces an electrolyte through a main conduit 96 and parallel branch inlet conduits 98, 100, to, respectively, a cathode electrode chamber 102 and an anode electrode chamber 104. The parallel returns from these chambers leave through outlet conduits 106, 108, respectively, to a replenishment tank 110 into which a make-up solution of concentrated sodium salts is supplied through a feed conduit 112. Said tank has an overflow 113 through which excess liquid runs to waste in an amount equal to the make-up input through the conduit 112, carrying with it hardness producing cations removed from the raw water in a softening chamber 122 and introduced into the cathode electrode chamber 102 through the cation permselective membrane 116. The cathode electrode chamber is defined by a cathode plate 114 and a cation permselective membrane 116. The anode electrode chamber 104 is defined by an anode plate 118 and a cation permselective membrane 120. The cation permselective membranes jointly define the softening chamber 122 containing a cation exchange material 124 on the $Na^+$ cycle. Hard (raw) water from a source is forced into the softening chamber by a pump 126 through an inlet conduit 128, leaving said chamber through an outlet conduit 130 as softened water.

By way of example, the cathode and anode are 21 inches high, 4 ⅜ inch wide and 1/2 inch thick, being constituted by graphite plates of grade 940S manufactured by Airco Speer Carbon Graphite Co. This grade of carbon will resist corrosion by a 3.5% sodium chloride solution. The cation permselective membranes are of the same plan dimensions and are AMFion C-100 membranes. The cation exchange material is an IR-120 cation exchange resin. The effective area of the electrode plates and the permselective membranes as limited by the gaskets is 16 inches by 3 ½ inches, in other words, approximately 0.4 ft.

Following are different examples of runs performed in the foregoing cell:

| | Examples | | |
|---|---|---|---|
| | 4 | 5 | 6 |
| Feed water hardness, ppm as Ca CO₃ | 254 | 295 | 272 |
| Flow rate, gph | 3.3 | 2.22 | 1.6 |
| Current density, amps/sq. ft. | see later | 5 | 3.75 |
| Total current, amperes | see later | 2 | 1.5 |
| Total voltage, volts | see later | 4.25 | 4.0 |
| Salt concentration in recirculation tank, % sodium chloride | 3.5 | 3.5 | * |
| Effluent soft water hardness, ppm in Ca CO₃ | — | 28 | 34 |
| Hardness removal, % | — | 90.5 | 87.5 |
| D.C. power consumption, kwh/1000 gals. | see later | 1.58 | 1.41 |

*Solution of 28,000 ppm NaCl and 7,000 ppm hardness, i.e. $Ca^{++}$ and $Mg^{++}$, simulating sea water.

Referring back to the fourth example, this was operated over different periods of time to see the variation of the current density versus voltage applied. The following results were observed:

| Time (Hours) | Current Density (i) (Amps/sq.ft.) | Voltage (E) (Volts) | Current (I) (Amp) |
|---|---|---|---|
| 1 | 1.25 | 3.00 | 0.5 |
| 2 | 2.50 | 3.50 | 1.0 |
| 3 | 3.75 | 4.00 | 1.5 |
| 4 | 5.00 | 4.50 | 2.0 |

At $i = 0$, $E_o$ which was equal to $E$ was 2.5 volts. From this data the power consumption was calculated. Let $W$ equal power consumed and be equal to $E - E_o \times I \div Q$. $Q$ is the total flow. The foregoing equation expresses the power consumed per 1,000 gallons of water treated.

The following is a table of the power consumption:

| Current (Amp) | $E-E_o$ (Volts) | $E-E_o \times I$ (watts) | W Kwh/1000 G |
|---|---|---|---|
| 0.5 | 0.5 | 0.25 | 0.25/3.3 = 0.076 |
| 1.0 | 1.0 | 1.00 | 1.00/3.3 = 0.303 |
| 1.5 | 1.5 | 2.25 | 2.25/3.3 = 0.680 |
| 2.0 | 2.0 | 4.00 | 4.00/3.3 = 1.210 |

It will be observed from the relationship between current and voltage that the voltage is a linear function of the current within the range observed with a very small slope of 0.4 volt (amperes/sq. ft.).

Also, the parameter $N/i$ ($N$ is the normality of the water being treated) is 1,000 for the 4 hour run of Example 4, $N$ being 0.005 eq/liter for 254 ppm of hardness as calcium carbonate. This parameter is a measure of the ability of a cell to perform effectively for a given area of permselective membrane. In the prior art a maximum value for said parameter was under 300.

With respect to the fifth example, it will be observed that the D.C. power cost for 1.58 kwh per thousand gallons, assuming an electricity charge of 0.8 cents per kwh, is very small to wit, 1.26 cents per thousand gallons treated. Here the parameter $N/i$ is 850, $N$ being equal to 0.00584 eq/liter which corresponds to 292 ppm raw water hardness.

Turning to the sixth example, it will be observed that the D.C. power cost is again small, to wit, 1.13 cents per thousand gallons, and that the parameter $N/i$ is 700, $N$ being 0.0054 eq/liter which corresponds to 272 ppm raw water hardness.

A cost comparison of any one of the examples shows the desirability of the new cell and method. Consider, for instance, example 6 in comparison to an ion exchange softening process with a cation exchange resin, the basis being 1,000 gallons of water with a hardness of 272 ppm as calcium carbonate. This is equal to 16 grams per gallons. In 1,000 gallons there are 16,000 grains. A typical resin capacity is 30,000 grains per cu. ft. at 10 lbs. of sodium chloride per cu. ft. This represents for the 16,000 grains of hardness a sodium chloride consumption of 5.35 lbs. which at 1.5 cents per lb. is a sodium chloride cost of 8.03 cent per thousand gallons. It will be recalled from the foregoing that the D.C. power cost pursuant to the present invention for the same amount of hardness is 1.13 cents per thousand gallons.

The foregoing cells are designed to simply soften water, that is to say, to substitute sodium cations for other cations that may be present in raw water, and are desirable particularly for substituting sodium cations for hard water cations, principally calcium and magnesium. The present invention also is useful, as been pointed out theretofore, for dealkalizing raw water, that is to say, substituting for anions which tend to alkalize water such, for example, as carbonates and bicarbonates, acid anions, all the salts of which are soluble. A typical such acidic anions is a chloride. Generally, pursuant to this aspect of the invention, the operative chamber, i.e., the dealkalizing chamber, is defined at opposite faces thereof by anion permselective membranes, rather that cation permselective membranes as in the case of the softening chamber, and the alkalizing chamber is filled with an anion exchange material, rather than a cation exchange material as was the case with the softening chamber. Otherwise, the cell essentially is similar to the cells which utilize the softening chamber. Indeed, as will be seen at a later point in the description, both softening and dealkalizing chambers can be employed in the same electrodialytic cell. It will be observed that the common feature of these two types of chamber is that, in each, opposite faces thereof are defined by the same type of permselective membranes, cation in the case of the softening chamber, anion in the case of the dealkalizing chamber, and the chambers are filled with an ion exchange material which is of the same type as the permselective membrane associated therewith, a cation exchange material for the softening chamber and an anion exchange material for the dealkalizing chamber.

Figure 4:
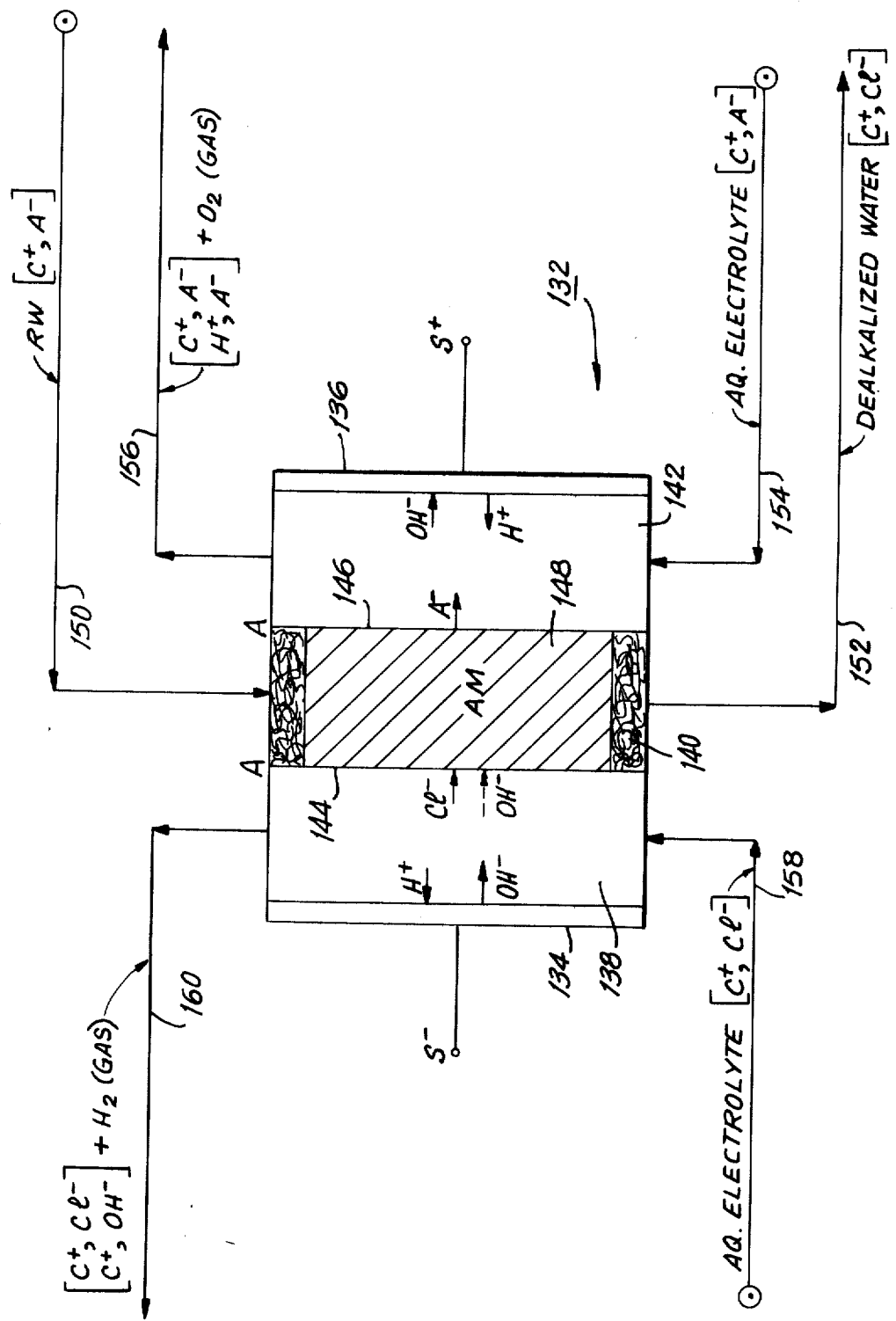
FIGS. 4 and 5 are schematic views of different electrodialytic cells constructed in accordance with the present invention for dealkalizing water.

Turning now to FIG. 4, which shows a specific example of a simple dealkalizing cell 132, the same is composed of a cathode electrode plate 134 and an anode electrode plate 136 respectively connected to a source S of D.C. potential. Between the plates, in order, are a cathode electrode chamber 138, a dealkalizing chamber 140, and an anode electrode chamber 142. The dealkalizing chamber is defined by a pair of anion permselective membranes 144, 146. Any suitable anion permselective membrane can be used, such membranes having been detailed earlier herein in connection with the description of FIG. 2. As in the case of the cells previously described, the plates and membranes are parallel to one another and adjacent plates and membranes are separated by spacing gaskets. The dealkalizing chamber is filled with an anion exchange material 148 which is operating on a $Cl^-$ cycle. Typical such materials are Amberlite IRA-900, IRA-400 and IRA-402 manufactured by Rohm & Haas Co.

Raw water is fed through an inlet conduit 150 to the dealkalizing chamber 140 and exits through an outlet conduit 152. The raw water typically contains salts which are designated by $C^+$ for a mixture of cations and $A^-$ for a mixture of anions. The water leaving the dealkalizing chamber as dealkalized water contains the same mixture of cations $C^+$ and largely chloride anions $Cl^-$ which have replaced most of the mixture of anions in the entering raw water. Through an inlet conduit 154 raw water is fed into the anode electrode chamber 142. The water leaves the anode electrode chamber through an outlet conduit 156.

Due to electrodialytic action, the undesirable anions $A^-$ present in the raw water flowing through the dealkalizing chamber 140 pass through the anion permselective membrane 146 to enter the anode electrode chamber 142, these mixed anions exiting through the outlet conduit 156. At the same time, water in the anode electrode chamber is electrolyzed, liberating oxygen gas that exits from this chamber through the conduit 156. This type of electrolyte in the anode electrode chamber will tend to corrode the anode if it is ferrous, although it will have no effect on an inert anode such as a platinized titanium or tantalum anode. If desired, the anode electrode chamber 142 can be swept with a sodium hydroxide solution, as mentioned in co-pending application Ser. No. 321,333, in which case, a ferrous anode plate can be used without fear of corrosion.

An aqueous electrolyte is introduced into the cathode electrode cell through an inlet conduit 158, the electrolyte, after modification, exiting through the outlet conduit 160. The electrolyte that flows through the cathode electrode chamber is any electrolyte that contains cations and chloride anions. For example, it may be brine, or sea water which is a form of brine. The fact that some of the cations may have insoluble salts is not significant because the cations are in the electrolyte in the presence of large amounts of chloride anions, so that the salts of these cations and chloride anions are soluble. Due to electrodialytic action, chloride anions in the electrolyte sweeping through the cathode electrode chamber 138 pass through the anion permselective membrane 144 to enter the dealkalizing chamber. In this chamber the chloride anions will, in the presence of the $Cl^-$ charged anion exchange material 148, replace most of the mixture of undesirable anions that have entered the dealkalizing chamber with the raw water, so that the water exiting from the dealkalizing chamber through the outlet conduit 152 will be substantially dealkalized water, such as described above, which contains a mixture of cations originally present in the raw water and chloride anions in most part, these having been substituted for a mixture of undesirable anions and said water specifically having had largely removed therefrom the bicarbonate and carbonate ions.

Due to electrolysis, some water in the cathode electrode chamber 138 will be broken down into hydrogen and hydroxide ions, the hydrogen ions forming hydrogen gas which exits from the cathode electrode chamber through the outlet conduit 160 and the hydroxide ions likewise exiting through said conduit 160. The presence of the hydroxide ions, some of which will pass through the anion permselective membrane 144, tend to reduce cell efficiency.

The cell 132 can be scaled up to include as many dealkalizing chambers as desired each having associated with it a chamber through which sea water flows between pairs of anion permselective membranes not containing an ion exchange material.

Figure 5:
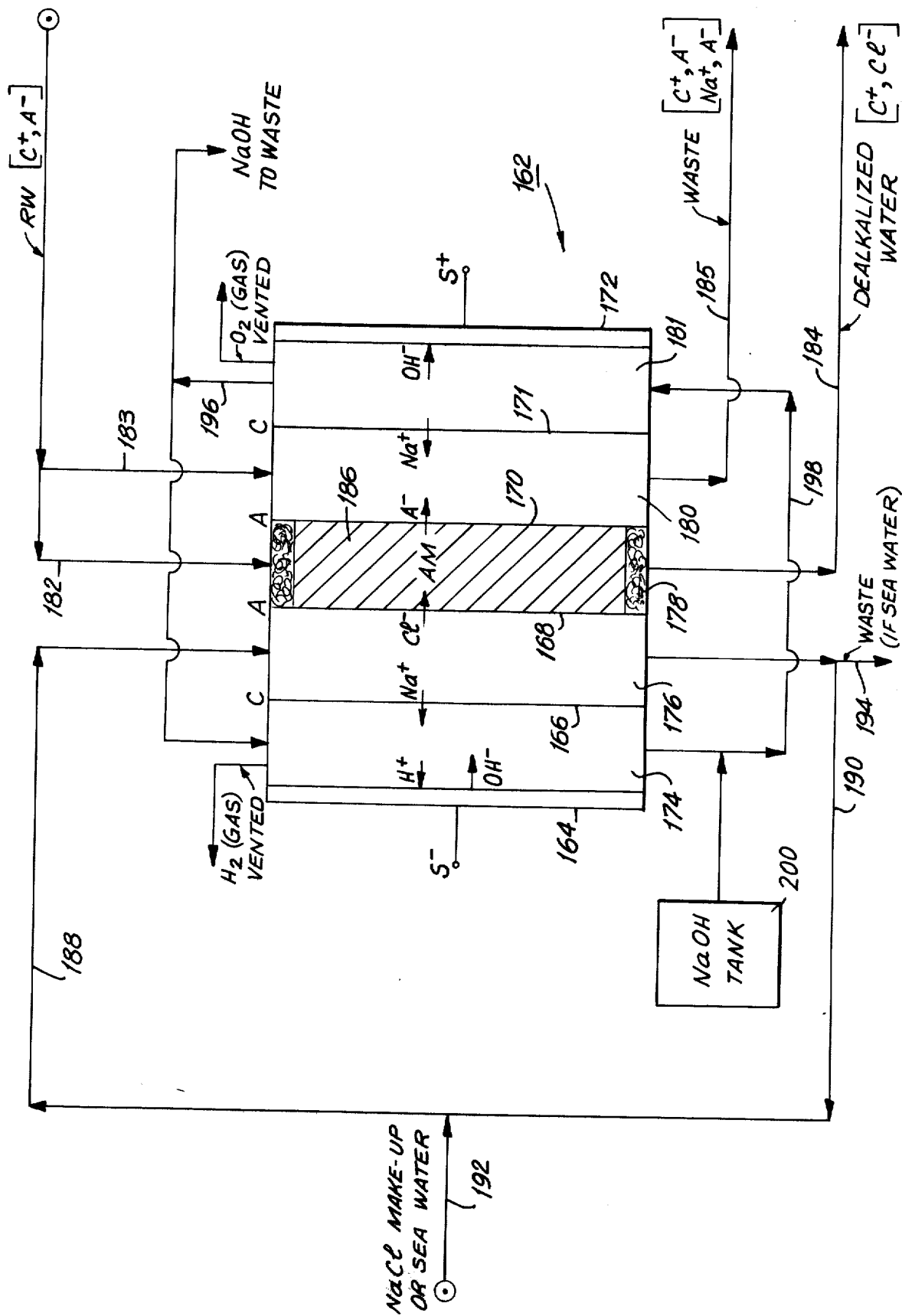

An improved version of the dealkalizing cell 132 is denoted by the reference numeral 162 in FIG. 5. This cell is similar to the cell 132 except that it includes two additional chambers, to wit, a sodium chloride chamber 176 interposed between the cathode electrode chamber and the dealkalizing chamber and a waste chamber interposed between the dealkalizing chamber and the anode chamber electrode and in that a sodium hydroxide circuit is provided for sweeping the two electrode chambers in series. In the cell 162 there are in sequence and arranged in parallel relationship a cathode electrode plate 164, a cation permselective membrane 166, an anion permselective membrane 168, a second anion permselective membrane 170, a cation permselective membrane 171 and a cathode electrode plate 172. These define, again in sequence, a cathode electrode chamber 174, a sodium chloride chamber 176, a dealkalizing chamber 178, a waste chamber 180 and an anode electrode chamber 181. Raw water is fed into the dealkalizing chamber 178 through an inlet conduit 182 and exits from the dealkalizing chamber through an outlet conduit 184 as dealkalized water having the same pH as the raw water. The dealkalizing chamber is filled with an anion exchange material 186 which is operating on a $Cl^-$ cycle.

The sodium chloride chamber 176 has a concentrated solution of sodium chloride fed to it through an inlet conduit 188, this electrolyte leaving said chamber after being modified in a manner soon to be described, through an outlet conduit 190 which feeds back to the inlet conduit 188. The inlet conduit is supplied with a source of make-up sodium chloride 192 which can be a more concentrated sodium chloride source or which simply may constitute sea water of which there is a substantially inexhaustible supply. If sea water is used as the source of sodium chloride, it is not necessary to employ a recirculation system. The sea water simply may be passed out to waste through a discharge conduit 194.

Cell 162 further includes a sodium hydroxide circuit. This includes a pair of conduits 196, 198. The conduit 196 conducts a sodium hydroxide electrolyte, that is to say, a water solution of sodium hydroxide (in all case where electrolytes or water or materials containing salts are mentioned, it is to be understood that the carrier invariably is water), from the anode electrode chamber 181 to the cathode electrode chamber 174, and the conduit 198 returns this solution from the cathode electrode chamber back to the anode electrode chamber to form a closed circuit. There is interposed in the conduit 198 a sodium hydroxide make-up tank 200.

In the cathode chamber 174 some water in the sodium hydroxide electrolyte is electrolyzed to hydrogen and hydroxide ions. The hydrogen ions form hydrogen gas which exits from this chamber. In the anode electrode chamber 181 oxygen gas is generated by electrolysis. In the sodium chloride chamber 176, due to electrodialysis, sodium ions will pass through the cation permselective membrane 166 into the cathode electrode chamber 174 where sodium hydroxide is formed with the aid of the hydroxide ions liberated by electrolysis. Such sodium hydroxide flows to the anode electrode chamber 181 where it prevents attack upon a ferrous anode plate 172 if the same is used. At the same time that sodium ions are migrating through the cation permselective membrane 166, chloride anions are permeating the anion permselective membrane 168 so as to enter the dealkalizing chamber 178. Hence, the content of sodium chloride in the electrolyte entering the sodium chloride chamber 176 is reduced. The chloride ions entering the dealkalizing chamber will, in the presence of the $Cl^-$ charged anion exchange material 186, be substituted to a large extent for the mixture of undesirable anions present in the raw water entering through the inlet conduit 182 so as to obtain the dealkalizing action mentioned earlier. At the same time, the mixture of undesirable anions, for which these chloride ions are substituting, leaves the alkalizing chamber through the anion permselective membrane 170 to enter the waste chamber 180.

These undesirable anions flow to waste through a conduit 185.

Reference previously has been made to the ability to combine, pursuant to the present invention, in a single electrodialytic cell, chambers of both types, to wit, dealkalizing and softening chambers. Essentially, this is accomplished by providing two such chambers in a single cell with appropriate auxiliary chambers for a source of supply of sodium chloride salt to furnish sodium ions to the softening chamber and chloride ions to the dealkalizing chamber, and by passing the input raw water through these two chambers in series, either chamber being first or last, as is desired. In the next two figures to be described, cells including both such chambers are disclosed.

Figure 6:
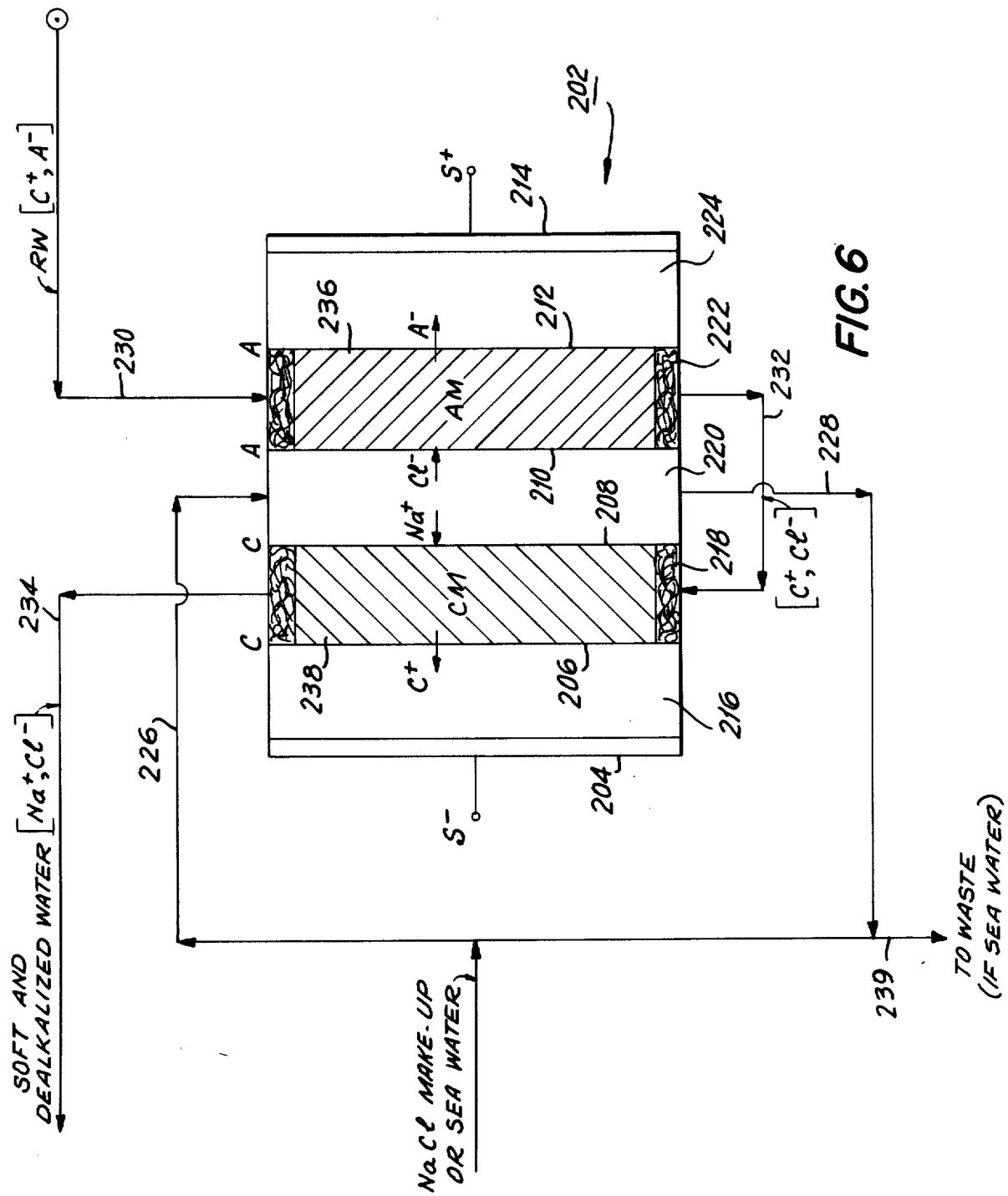

The first such cell is an electrodialytic cell 202 illustrated in FIG. 6. Said cell is of the simplest type that can be employed having the two different chambers aforementioned. Specifically, the cell includes in sequence and arranged in parallel relationship a cathode electrode plate 204, a cation permselective membrane 206, a second cation permselective membrane 208, an anion permselective membrane 210, a second anion permselective membrane 212 and an anode electrode plate 214. A source S of D.C. power supplies D.C. voltage to the electrode plates. These define in sequence a cathode electrode chamber 216, a softening chamber 218, a sodium chloride chamber 220, a dealkalizing chamber 222 and an anode electrode chamber 224.

In order to supply sodium ions to the softening chamber 218 and chloride anions to the dealkalizing chamber 222, a sodium chloride electrolyte is swept through the sodium chloride chamber 220, being introduced through an inlet conduit 226 and exiting through an outlet conduit 228. If the source of sodium chloride is sea water, the conduit 228 may discharge to waste through a conduit 239, e.g. back to the sea. If sea water is not readily available, a closed circuit is used for the sodium chloride chamber, the conduit 228 being connected back to the conduit 226 and there being interposed a sodium chloride make-up tank in these interconnected conduits, such make-up tank being necessary due to the loss of sodium and chloride ions in the sodium chloride chamber, as will be explained subsequently. Any suitable electrolyte may be employed to sweep the cathode electrode chamber and the anode electrode chamber. Preferably, a sodium hydroxide electrolyte may be employed. This may pass through the chambers in parallel or series. The particular electrolyte employed is not crucial since the cell will work with any electrolyte inasmuch as no ions will pass through them back into the softening and dealkalizing chambers, as soon will be appreciated. Sodium hydroxide is a preferred form of electrolyte if the anode electrode is ferrous. If it is not ferrous but is made of an inert material such as has been mentioned previously, any type of electrolyte can be used as just indicated, for example, salt water. No circuits have been shown for supplying electrolyte to the cathode electrode chamber and anode electrode chamber inasmuch as these do not enter into the operation of the cell 202.

Feed water is fed into either the softening or the dealkalizing chamber. In this case, feed water, e.g. raw water, is shown entering the dealkalizing chamber 222 through an inlet conduit 230. The water leaves the dealkalizing chamber through a conduit 232 which leads it to the softening chamber 218. The water leaving the dealkalizing chamber contains the mixed cations in the raw water, but instead of the mixed anions in the raw water, it contains largely chloride ions substituted for most of the mixed anions. This water then enters the softening chamber where sodium is substituted for most of the mixed cations so that the water leaving the softening chamber through an outlet conduit 234 is softened and dealkalized water, essentially constituting a weak sodium chloride aqueous solution.

In operation of the cell 202, due to electrodialytic action, chloride anions from the sodium chloride chamber 220 will pass through the anion permselective membrane 210 into the dealkalizing chamber 222 where they will replace mixed anions in the feed water and at the same time these mixed anions will, in most part, pass through the anion permselective membrane 212 into the anode electrode chamber 224. Because of the presence of anion exchange material 236 on the $Cl^-$ cycle in the dealkalizing chamber, the foregoing exchange will take place in the salts present in the feed water without, however, changing the $Cl^-$ charge on the said material so that the operation can be continuous. Hence, the water leaving through the conduit 232 contains mixed cations present in the original feed water and, in large part, chlorides for the anions with a negligible quantity of mixed anions.

This water then traverses the softening chamber 218 where, due to electrodialytic action and the presence of a cation exchange material 238 in said chamber which has an $Na^+$ charge, sodium cations entering the chamber 218 from the salt chamber 220 will substitute, in most part, for the mixed cations that are present, whereby the water now leaving through the outlet conduit 234 will be a weak sodium chloride solution containing negligible amounts of the original undesirable cations and undesirable anions which have been replaced pursuant to the foregoing with sodium and chloride ions. The electrolysis of the water carrier in the electrode chambers is the same as has been mentioned before and, thus, will not be discussed.

Sodium chloride which is used up in the chamber 220 is replaced by a sodium chloride make-up tank or by the use of new sea water. It will be observed that both the dealkalizing and the softening chamber function in a manner similar to that described for cells in which these chambers were present either singly or in multiple but not in a mixed fashion, as in the case of the cell 202. It also will be appreciated that the feed water may be introduced first into the chamber 218 and then transferred through the conduit 232 to the chamber 222 from which it will leave as softened dealkalized water.

A somewhat modified version of a mixed cell denoted by the reference numeral 240 is illustrated in FIG. 7. The cell there shown likewise is arranged to perform both softening and dealkalizing functions. This cell has one additional chamber, to wit, a waste chamber, which is independent of the electrode chambers, it being recalled that in the cell 202 the waste, to wit, the unwanted cations and unwanted anions, are, to the extent that they are transferred, transferred into the electrode chambers, eventually finding their way to waste, unless a battery of such softening and alkalizing chambers is employed. In the cell 240, however, special provision is made for removing these unwanted ions without utilizing plural softening chambers and plural alkalizing chambers, although in a commercial cell such pluralities usually would be present.

Referring in detail to said cell 240, the physical elements of the cell include, in sequence and arranged in parallel relationship, a cathode electrode plate 242, a cation permselective membrane 244, an anion permselective membrane 246, a second anion permselective membrane 248, a second cation permselective membrne 250, a third cation permselective membrane 252 and an anode electrode plate 254. A source S of D.C. power supplies D.C. voltage to the two electrode plates. These define in sequence a cathode electrode chamber 256, a sodium chloride chamber 258, a dealkalizing chamber 260, a waste chamber 262, a softening chamber 264 and an anode electrode chamber 266. The dealkalizing chamber is filled with an anion exchange material 268 on the $Cl^-$ cycle, and the softening chamger 264 is filled with a cation exchange material 270 on the $Na^+$ cycle.

The salt cycle includes an inlet conduit 272 through which a sodium chloride solution is fed into the sodium chloride chamber 258 by a pump 274 which draws a salt electrolyte solution from a salt make-up tank 276. Solid sodium chloride or a highly concentrated sodium chloride aqueous solution is fed through a conduit 278 into the salt tank. Sodium and chloride ions are depleted from the sodium chloride chamber 258 in the operation of the cell, as will be described hereinafter, and the depleted salt electrolyte is conducted from the salt chamber to the salt tank through a conduit 280.

The electrolyte circuit for the electrode chambers 256, 266 includes an inlet conduit 282 which leads to both the electrode chambers in parallel. Sodium hydroxide is supplied to the conduit 282 and, therefore, to both electrode chambers, by a pump 284 from a sodium hydroxide tank 286. Conduits 288, 290 lead from the two different electrode chambers back to the sodium hydroxide tank. Sodium hydroxide is generated in the cathode electrode chamber 256 as fast as it is used up in the anode electrode chamber. However, to make certain that the concentration of sodium hydroxide in the electrolyte sweeping the electrode chamber is present to prevent corrosion of non-inert electrodes, e.g. a ferrous electrode in the anode electrode chamber, such concentration being mentioned exemplificatively in application Ser. No. 321,333, a source of make-up sodium hydroxide (not shown) may be furnished for the sodium hydroxide tank. This source may be solid crystals or simply a concentrated sodium hydroxide solution.

The flow path for dealkalization and softening starts at a source of raw water from which a conduit 292 leads to the dealkalizing chamber 260. A transfer conduit 294 is provided to connect the effluent from the dealkalizing chamber to the softening chamber 264 from which the output of the cell 240 leaves via a conduit 296.

Electrolyte is supplied to the waste chamber 262 by a conduit 298 which taps the sodium chloride electrolyte from the salt conduit 280. It is true that the conduit 280 contains a low level of sodium chloride, the sodium chloride ions having been considerably lessened in passage through the chamber 258. Nevertheless, this is of no consequence because, as later will be appreciated, the only requirement of the electrolyte flowing through the waste chamber 262 and exiting through a conduit 300 to waste is that it be electrically conductive. It does not furnish any ions to adjacent chambers. A conduit 302 is tapped off the dealkalized and softened water outlet conduit 296 to supply a small amount of make-up water to the salt tank 276. The flow of make-up water through the conduit 302 is regulated as by a valve 304 to obtain a desirable degree of concentration of sodium chloride in the inlet to the salt chamber. A typical concentration is 5,000 ppm. In passing, it may be mentioned that a typical concentration of sodium hydroxide in the conduit 282 is 2,000 ppm.

It would be superfluous to describe the flow of ions in the electrodialytic operation of the cell 240 since it is essentially the same as the flow of ions in the cell 202 except for the fact that the mixed undesirable anions leaving the dealkalizing chamber and the mixed undesirable cations leaving the softening chamber, instead of entering the electrode chambers as in the cell 202, enter the waste chamber 262 from which they are discharged to waste through the conduit 300 along with the electrolyte introduced into the waste chamber via the conduit 298.

Typical examples for the operation of the cell 240 follow:

|  |  | EXAMPLES | |
| --- | --- | --- | --- |
|  |  | 7 | 8 |
| Feed water, | total dissolved solids, ppm as $CaCO_3$ | 250 | 250 |
| Feed water, | total hardness, ppm as $CaCO_3$ | 125 | 125 |
| Feed water, | total ($HCO_3^-$) alkalinity ppm as $CaCO_3$ | 125 | 125 |
| Feed water pH |  | 7.8 | 7.8 |
| Pressure, psi |  | 5.5 | 5.5 |
| Feed water, flow rate, gph |  | 1.5 | 2 |
| Current density, amps/sq.ft. |  | 2 | 2 |
| Total current, amperes |  | 0.8 | 0.8 |
| Total voltage, volts |  | 4.25 | 5.40 |
| Caustic concentration in NaOH tank, ppm NaOH |  | 2000 | 2000 |
| Salt concentration in salt tank, ppm NaCl |  | 5000 | 5000 |
| Effluent water quality |  |  |  |
| Hardness, ppm as $CaCO_3$ |  | 18 | 30 |
| $HCO_3^-$ alkalinity, ppm as $CaCO_3$ |  | 22 | 28 |
| pH |  | 7.1 | 8.0 |
| Hardness removal, % |  | 86 | 76 |
| Alkalinity removal, % |  | 83 | 78 |
| D.C. power consumption, kwh/1000 gals. |  | 2.25 | 2.21 |

All of the cells herein described can be scaled up into batteries with as many treating chambers as is desired or is economically feasible. The scaling up of some of the cells has been detailed but it is to be observed that this merely was exemplificative and that all cells can be enlarged by series repetitions.

It thus will be seen that there are provided cells which achieve the various objects of the invention and which are well adapted to meet the conditions of practical use.

As various possible embodiments might be made of the above invention, and as various changes might be made in the embodiments above set forth, it is to be understood that all matter herein described or shown in the accompanying drawings is to be interpreted as illustrative and not in a limiting sense.

Having thus described the invention there is claimed as new and desired to be secured by Letters Patent:

1. An electrodialytic apparatus for softening hard raw water, said apparatus comprising at least five serially disposed compartments including a first compartment having a ferrous cathode electrode disposed therein, a second compartment immediately adjacent said first compartment and separated therefrom by a cation permselective membrane, a third compartment immediately adjacent said second compartment and separated therefrom by an anion permselective membrane, a fourth compartment immediately adjacent said third compartment and separated therefrom by a cation permselective membrane, a body of cation exchange material disposed within said fourth compartment, a fifth compartment immediately adjacent said fourth compartment and separated therefrom by a cation permselective membrane, a ferrous anode electrode disposed in said fifth compartment, means for introducing hard raw water into the fourth compartment, means for introducing into and removing from the second compartment an aqueous solution of sodium chloride, means for introducing into and removing from the third compartment electorlyte fluid, means for introducing into and removing from the first and fifth compartments an aqueous caustic solution, means for impressing a direct electric current across said cathode and anode electrodes, and means for removing softened water from the fourth compartment.

2. An apparatus as set forth in claim 1 wherein means is included to recirculate the aqueous solution of sodium chloride from a point of exit from the second compartment to a point of entrance to the second compartment.

3. An apparatus as set forth in claim 2 wherein means is included for supplying a make-up of aqueous solution of sodium chloride to the means for introducing an aqueous solution of sodium chloride into the second compartment.

4. An apparatus as set forth in claim 1 wherein means is included to recirculate the aqueous caustic solution through the first and fifth compartments.

5. An apparatus as set forth in claim 4 wherein means is included to provide aqueous caustic solution make-up to the first and fifth compartments.

6. An electrodialytic apparatus for dealkalizing raw water, said apparatus comprising at least five serially disposed compartments including a first compartment having a ferrous cathode electrode disposed therein, a second compartment immediately adjacent said first compartment and separated therefrom by a cation permselective membrane, a third compartment immediately adjacent said second compartment and separated therefrom by an anion permselective membrane, a body of anion exchange material disposed within said third compartment, a fourth compartment immediately adjacent said third compartment and separated therefrom by an anion permselective membrane, a fifth compartment immediately adjacent said fourth compartment and separated therefrom by a cation permselective membrane, a ferrous anode electrode disposed in said fifth compartment, means for introducing raw water into the third compartment, means for introducing into and removing from the fourth compartment electrolyte fluid, means for introducing into and removing from the first and fifth compartments an aqueous caustic solution, means for impression a direct electric current across said cathode and anode electrodes, and means for removing dealkalized water from the third compartment.

7. An apparatus as set forth in claim 6 wherein means is included to recirculate the aqueous solution of sodium chloride from a point of exit from the second compartment to a point of entrance to the second compartment.

8. An apparatus as set forth in claim 7 wherein means is included for supplying a make-up of aqueous solution of sodium chloride to the means for introducing an aqueous solution of sodium chloride into the second compartment.

9. An apparatus as set forth in claim 6 wherein means is included to recirculate the aqueous caustic solution through the first and fifth compartments.

10. An apparatus as set forth in claim 9 wherein means is included to provide aqueous caustic solution make-up to the first and fifth compartments.

11. An electrodialytic apparatus for softening and dealkalizing hard raw water, said apparatus comprising at least six serially disposed compartments including a first compartment having a ferrous cathode electrode disposed therein, a second compartment immediately adjacent said first compartment and separated therefrom by a cation permselective membrane, a third compartment immediately adjacent said second compartment and separated therefrom by an anion permselective membrane, a body of anion exchange material disposed within said third compartment, a fourth compartment immediately adjacent said third compartment and separated therefrom by an anion permselective membrane, a fifth compartment immediately adjacent fourth compartment and separated therefrom by a cation permselective membrane, a body of cation exchange material disposed within said fifth compartment, a sixth compartment immediately adjacent said fifth compartment and separated therefrom by a cation permselective membrane, a ferrous anode electrode disposed in said sixth compartment, means for introducing hard raw water into the third compartment, means for introducing into and removing from the second compartment an aqueous solution of sodium chloride, means for introducing into and removing from the fourth compartment an electrolyte fluid, means for introducing into and removing from the first and sixth compartments an aqueous caustic solution, means for impressing a direct electric current across said cathode and anode electrodes, means for removing dealkalized water from the third compartment and introducing it into the fifth compartment, and means for removing softened and dealkalized water from the fifth compartment.

12. An apparatus as set forth in claim 11 wherein means is included to recirculate the aqueous solution of sodium chloride from a point of exit from the second compartment to a point of entrance to the second compartment.

13. An apparatus as set forth in claim 12 wherein means is included for supplying a make-up of aqueous solution of sodium chloride to the means for introducing an aqueous solution of sodium chloride into the second compartment.

14. An apparatus as set forth in claim 11 wherein means is included to recirculate the aqueous caustic solution through the first and sixth compartments.

15. An apparatus as set forth in claim 14 wherein means is included to provide aqueous caustic solution make-up to the first and sixth compartments.

* * * * *